United States Patent
Eccles et al.

(10) Patent No.: US 7,113,930 B2
(45) Date of Patent: Sep. 26, 2006

(54) CONDUCTING TRANSACTIONS

(75) Inventors: Stephen Eccles, Callington (GB); Michael Kinateder, Lenningen (DE); Robert Howard Cole, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 572 days.

(21) Appl. No.: 10/079,961

(22) Filed: Feb. 21, 2002

(65) Prior Publication Data

US 2002/0123973 A1 Sep. 5, 2002

(30) Foreign Application Priority Data

Feb. 23, 2001 (GB) ................................. 0104666.3

(51) Int. Cl.
*G06Q 99/00* (2006.01)
*H04L 9/00* (2006.01)

(52) U.S. Cl. .............................. 705/65; 705/1; 705/17; 705/18; 705/44; 380/23; 380/24

(58) Field of Classification Search ..................... 705/1, 705/65, 17, 18, 44; 380/23, 24
See application file for complete search history.

(56) References Cited

U.S. PATENT DOCUMENTS

| 5,557,518 A | | 9/1996 | Rosen |
| 5,826,245 A | * | 10/1998 | Sandberg-Diment ......... 705/44 |
| 6,014,646 A | | 1/2000 | Vallee et al. |
| 6,023,682 A | * | 2/2000 | Checchio ..................... 705/18 |

FOREIGN PATENT DOCUMENTS

| EP | 0731580 A1 | 9/1996 |
| EP | 0801479 A1 | 10/1997 |
| EP | 0833285 A2 | 4/1998 |
| EP | 0865010 A1 | 9/1998 |
| GB | 2332833 A | 6/1999 |
| GB | 2350982 A | 12/2000 |
| JP | 05174232 * | 7/1993 |
| WO | WO96/13013 | 5/1996 |
| WO | WO96/29667 | 9/1996 |
| WO | WO 00/55777 | 9/2000 |
| WO | WO 00/70487 | 11/2000 |
| WO | WO01/37180 A | 5/2001 |

OTHER PUBLICATIONS

Payment Card Industry Data Security Standard, VISA Corp. Dec. 2004.*
Chaum D: "Security Without Identification: Transaction Systems to Make Big Brother Obsolete", Communications of the Association for Computing Machinery, ASsociation for Computing Machinery, New York, US, vol. 28, NR. 10, pp. 1030-1044, XP002000086 ISSN: 0001-0782.

* cited by examiner

*Primary Examiner*—James P. Trammell
*Assistant Examiner*—John M. Winter
(74) *Attorney, Agent, or Firm*—Thomas, Kayden, Horstemeyer, & Risley LLP

(57) ABSTRACT

A two-part payment token is used during a transaction whereby a buyer obtains goods/services from a seller. The token, which does not identify the buyer, is given to a trusted third party (TTP) by the buyer. The TTP releases a first part of the token to the seller who then releases the goods/services to the buyer. Upon confirming receipt of the goods/services by the buyer, the TTP releases the second part of the payment token to the seller, who may then present both parts of the token to the buyer's bank to obtain payment.

49 Claims, 4 Drawing Sheets

CONDUCTING TRANSACTIONS

FIELD OF THE INVENTION

The invention relates to methods and apparatus for performing transactions. In particular, the invention relates to transactions wherein a subject, such as goods or services, is transferred in exchange for payment.

It is known to conduct credit card transactions electronically. There are various disadvantages associated with such a process. First, the purchaser is identified in the payment order. This deprives the purchaser of the level of anonymity provided by a cash transaction. Further, a payment order specifies the account number of the purchaser, making the account visible to persons for attempting to make unauthorised withdrawals. Second, the purchaser is not in control of the transaction, particularly in situations such as where goods are ordered via the Internet for delivery later.

SUMMARY OF THE INVENTION

It is an aim of the invention to ameliorate at least some of the disadvantages mentioned above.

According to one aspect, the invention provides a transaction method in which a first party transfers a first part of a payment token to a second party to obtain the subject of the transaction, the first party transfers a second part of the payment token to a third party, the first party issues a notification that the subject has been received, and the third party, subsequent to receiving notification that the first party has received the subject, releases the second part of the payment token to the second party to allow payment to the second party.

The invention also consists in a system for performing transactions, comprising third party data processing apparatus connected to first and second parties engaging in a transaction for communication therewith, wherein the third party data processing apparatus comprises a transferor arranged to receive a second part of a payment token from a first party to a transaction and a verifier arranged to verify that the subject of the transaction has been received by the first party, to enable the transferor to release said second part to a second party for use with a first part of said token to permit payment to the second party.

The invention thus provides that the outcome of the transaction is constrained in that either the first party pays and accepts the subject of the transaction, or the first party does not pay and does not accept the subject of the transaction. The first party thus retains greater control of the transaction.

The subject of the transaction between the first party, i.e. the purchaser, and the second party, i.e. the seller, may be, for example, either goods or services.

In one embodiment, the token is provided by a financial institution supporting the first party in response to a request identifying the proposed transaction.

In one embodiment, the first party can cancel the transaction by requesting the third party data processing apparatus to do so. This is useful where, for example, the subject of the transaction has not been received or is defective.

In one embodiment, the token does not identify the first party, but can be presented by the second party to a financial institution supporting the first party to obtain payment. This provides the first party with control over the disclosure of its identity and makes its account less susceptible to attempted unauthorised transactions. In this connection, the invention, according to another aspect, provides a transaction method wherein a first party transfers a payment token to a second party in exchange for the subject of a transaction, the method comprising the step of the first party transferring at least one part of a payment token to the second party via a third party, and wherein the payment token does not identify the first party. The invention also consists in a system for performing transactions, comprising first, second and third parties, said first and second parties being interconnected for communication via the third party to enable the first party to give a payment token to the second party in return for the subject of a transaction, wherein the first party is arranged to transfer at least one part of the payment token to the second party via the third party, and the payment token does not identify the first party.

In one embodiment, the token does not identify the first party at least in so far as the identity of the account the first party uses to pay, and achieves this by specifying the identity of the second party in the token. Thus, the token allows the payment to be made without exposing the first party's account to fraudulent approaches. The token may identify the second party by identifying the second party's account.

BRIEF DESCRIPTION OF THE DRAWINGS

By way of example only, certain embodiments of the invention will now be described with reference to the accompanying figures, in which.

DETAILED DESCRIPTION OF THE PREFERRED EMBODIMENT OF THE INVENTION

Figure 1:
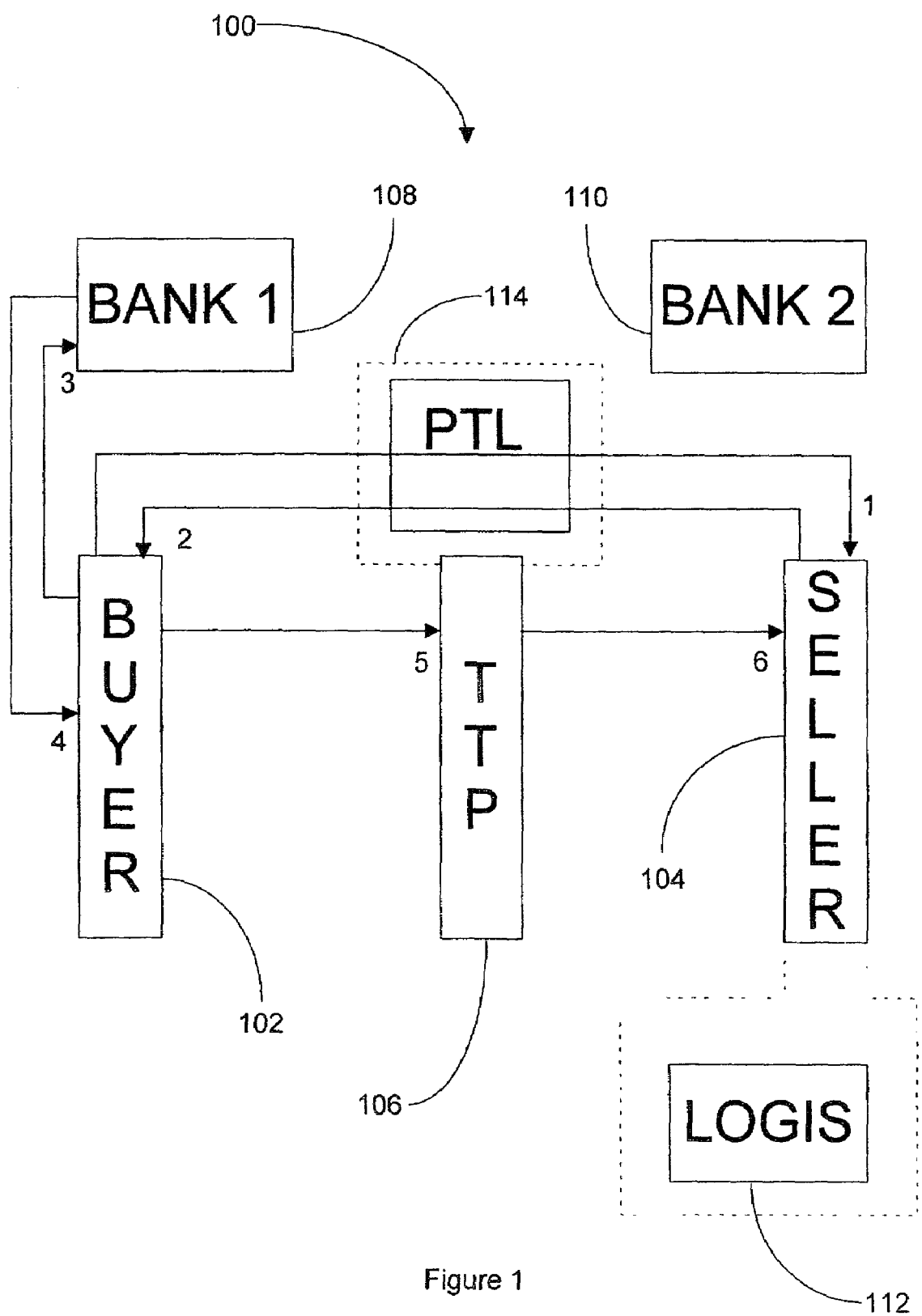
FIG. 1 is a block diagram of a transaction system illustrating the actions involved in initiating the transaction.

The transaction system 100 of FIG. 1 performs transactions between a buyer 102 and seller 104 through the intermediary of a trusted third party 106 or "TTP". The system also embraces the banks 108 and 110 which maintain accounts for the buyer 102 and the seller 104 respectively. As shown in FIG. 1, a logistics agent 112 is associated with the seller 104, as indicated by the dotted line. The logistics agent 112 is responsible for transferring from the seller 104 to the buyer 102 the goods which are the subject of the transaction. Although in FIG. 1 the logistics agent 112 is shown as part of, and under the control of, the seller 104, it will be apparent that the logistics agent 112 may be part of, and under the control of, the buyer 102 or, alternatively, a separate entity commissioned by either the buyer or the seller to perform said transfer of goods. There will be cases where the subject of the transaction consists of intangible goods, such as downloadable software. In such a case, the TTP 106 takes the role of the logistics agent 112.

The operation of the transaction system 100 will now be described by reference to actions occurring between the various parts 102 to 112 of the system 100. It will be apparent that any parts 102 to 112 of the system participating in an action need to be linked for electronic communication, either permanently or for a sufficient interval to complete the action in question. In essence, each of the parts 102 to 112 of the system comprises an independent computer system, each having its own role in the transaction process, as will become apparent from the following description.

With reference to FIG. 1, the buyer sends an initial request (arrow 1) to the seller for information regarding the cost and availability of goods that the buyer wishes to purchase. The seller responds with an offer (arrow 2) to the buyer providing information regarding the cost and availability of the goods and details of the account which is to receive payment. The request and the offer represented by arrows 1 and 2 respectively are routed via a market-maker, portal or retail front-end, 114, which forms part of the TTP 106. (In other embodiments the market-maker 114 does not form part of the TTP 106 but is independent.) The buyer then requests (arrow 3) a payment token from its bank 108. The bank 108 responds by generating a payment token which is returned (arrow 4) to the buyer.

The payment token obtained is restricted for use only in the transaction defined by the offer returned from the seller (arrow 2). The payment token request (arrow 3) contains sufficient information regarding the offer from the seller to allow the bank 108 to make the payment token specific to this transaction. If the payment token is presented by the seller's bank 110 to the buyer's bank 108, then the buyer's bank 108 will respond by supplying the seller's bank 110 with the amount specified in the payment token, which is the amount specified in the offer (arrow 2) provided by the seller. However, the token does not identify the buyer nor its account because the token is certified by the buyer's bank so that if it is subsequently rendered to the buyer's bank for payment, the buyer's bank can verify the authenticity of the token before proceeding with payment. The token has a two part structure and both parts of the token need to be presented to the buyer's bank 108 in order for payment to be rendered on the token. The token may be provided by the buyer's bank in its complete two-part format, or the buyer's bank may provide a first part of the token from which the buyer then generates the second part of the token (e.g. by generating a digital signature based on the first part).

Having received the token, the buyer 102 passes (arrow 5) the token to TTP 106. The TTP divides the token into its two parts and passes (arrow 6) one part of the token to the seller 104 and retains the other part of the token for the time being. The seller 104 then authenticates the first part of the token that it received, possibly by sending it to its bank 110. It is however possible for the seller to retain the first part of the token until such time as it receives the second part of the token and then to pass both parts to its bank. The procedure by which the seller obtains the second part of the token from the TTP 106 will be described later.

Figure 2:
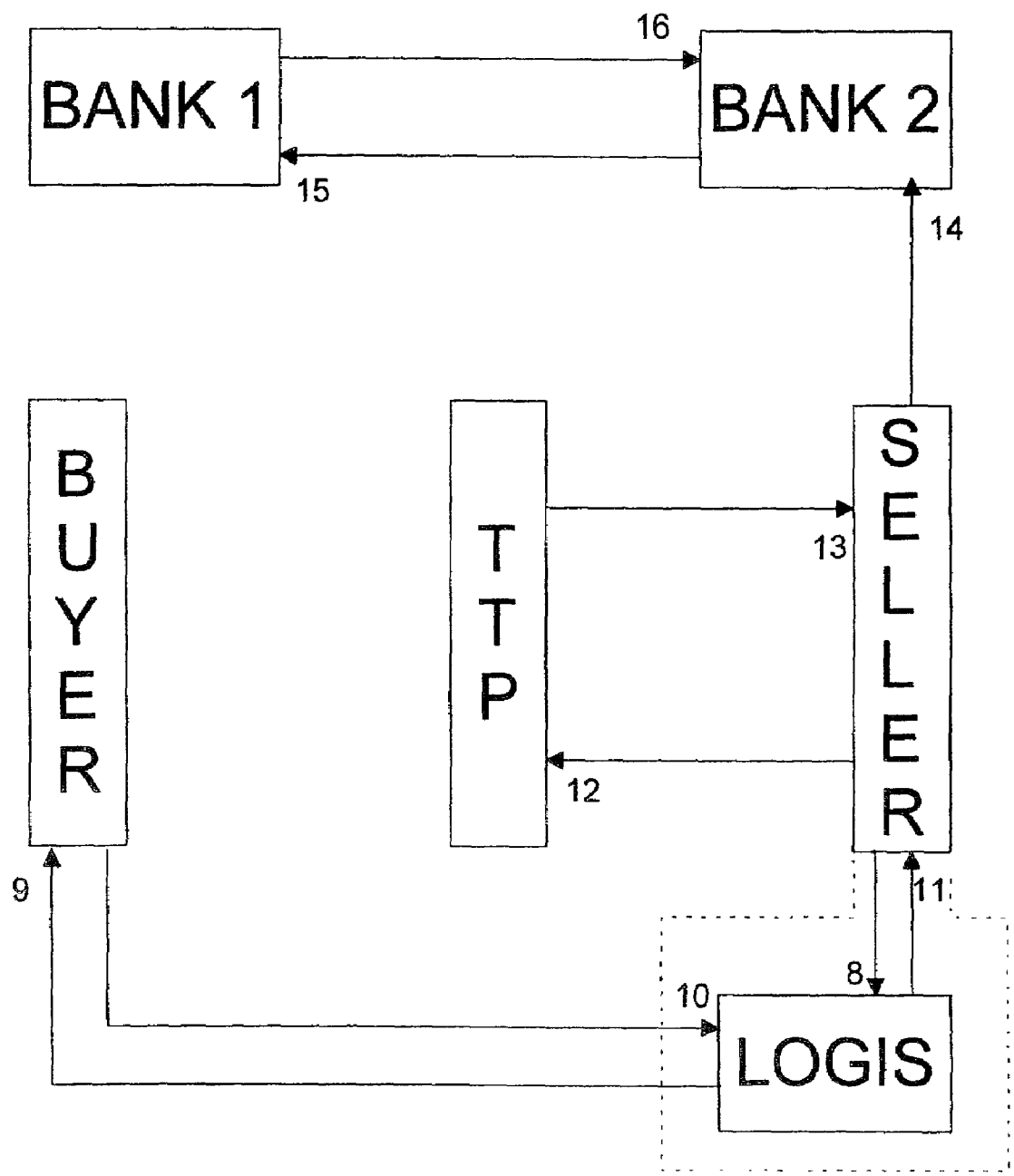
FIG. 2 shows the transaction system of FIG. 1, and the actions performed during the completion of a transaction.

FIG. 2 illustrates the actions necessary to complete the transaction initiated in FIG. 1.

Having received the first part of the payment token, the seller 104 instructs the logistics agent 112 to transfer (arrow 9) the goods that are the subject of the transaction to the buyer. If the goods are satisfactory, the buyer accepts them and provides (arrow 10) an obligatory receipt to the logistics agent which is forwarded (arrow 11) to the seller. The seller, in order to obtain the second part of the payment token, submits (arrow 12) the receipt provided by the buyer to the TTP. If the TTP determines that the receipt is authentic, then it responds by releasing (arrow 13) the second part of the token to the seller. Preferably, the receipt provided by the buyer is electronic and contains a digital signature which the TTP can test for authenticity. The seller provides (arrow 14) the second part of the token to its bank. The seller's bank is then able to present (arrow 15) the complete payment token to the buyer's bank. The buyer's bank responds by transferring (arrow 16) the sum specified in the payment token to the seller's bank account in bank 110.

It is possible that the buyer may be able to obtain the goods from the logistics agent without providing a valid receipt for use with the TPP. In this case, it is preferable that the first part of the token expresses the legal intention of the buyer to pay the seller upon delivery so that the seller is able to obtain redress via the legal system or other dispute resolution mechanism where the buyer reneges.

Figure 3:
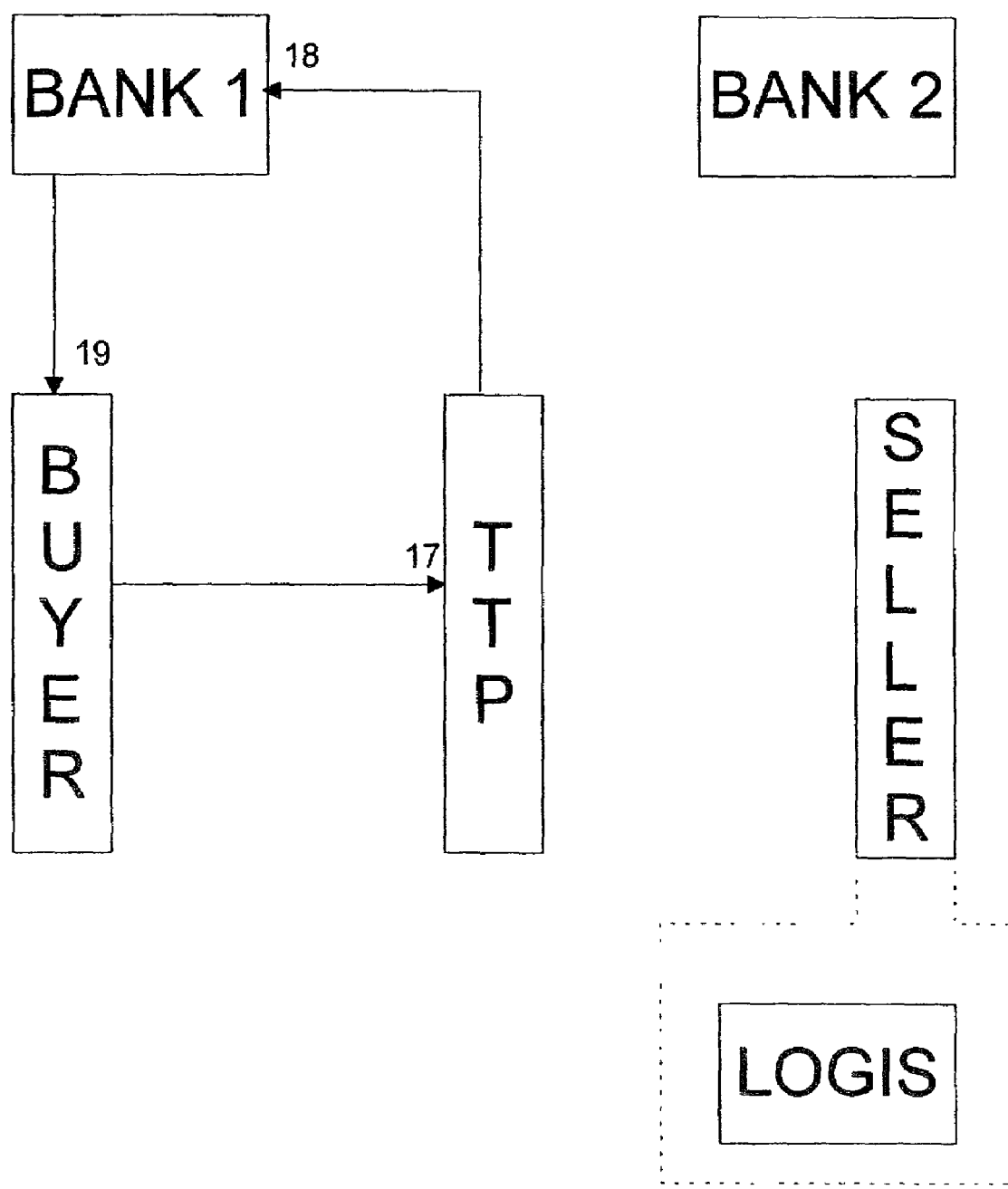
FIG. 3 shows the transaction system of FIG. 1 during the cancellation of a transaction.

FIG. 3 illustrates the actions which occur in the situation where the buyer opts to cancel the transaction initiated in FIG. 1. There are many reasons why this might occur. For example, the goods delivered to the buyer by the logistics agent (arrow 9) are unacceptable or the buyer has simply decided to abort the transaction. The buyer informs (arrow 17) the TTP that it desires to cancel the transaction. Thereafter, the TTP will not release the second part of the payment token to the seller. The TTP in turn requests (arrow 18) the buyer's bank to cancel the payment token. The bank does so, and reports (arrow 19) to the buyer that the payment token has been cancelled. Of course, the buyer cannot cancel the payment token after having accepted the goods/subject by providing a receipt for them/it.

Figure 4:
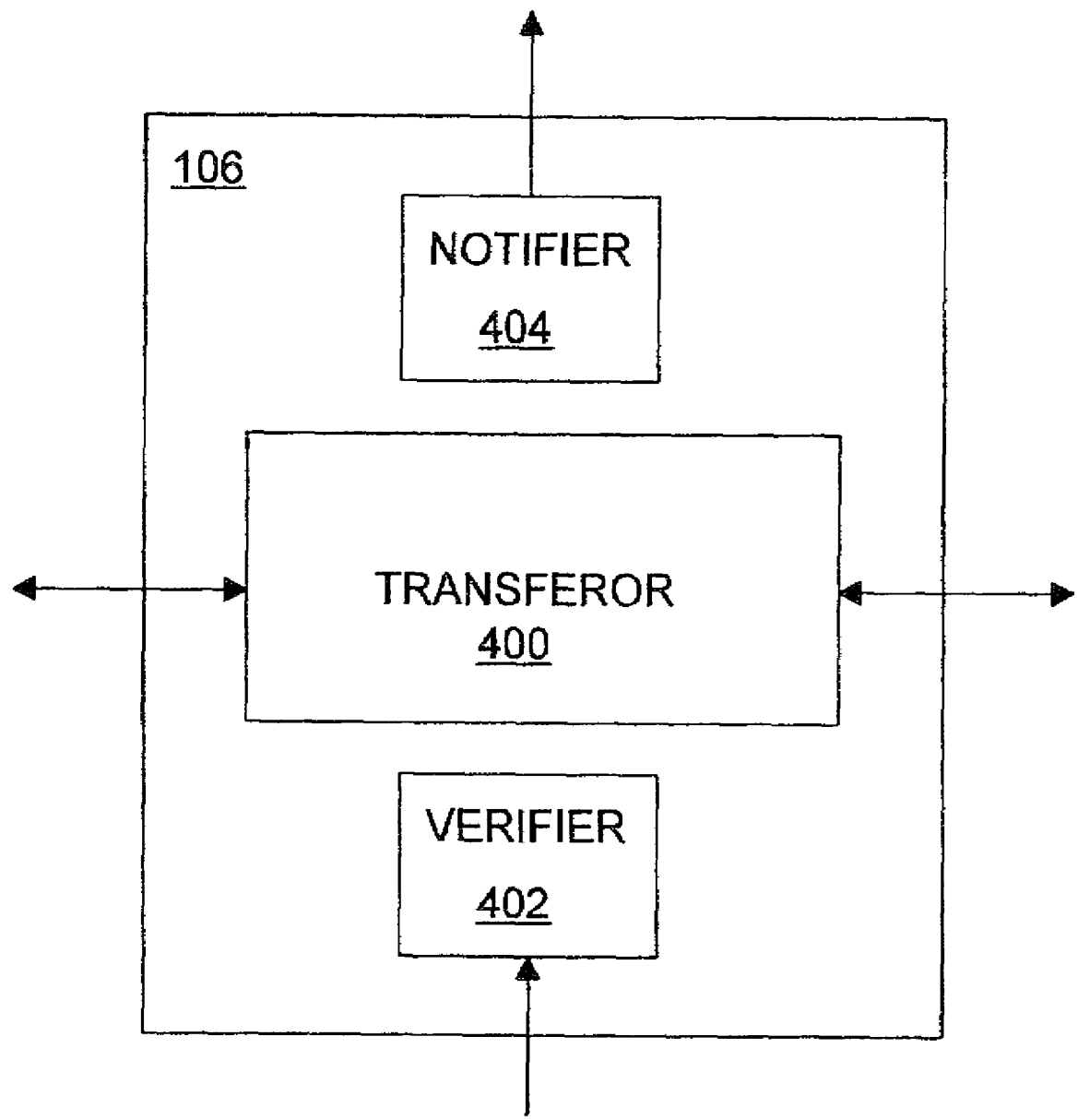
FIG. 4 is a block diagram illustrating the structure of an intermediary device.

FIG. 4 illustrates the structure of the computer system forming the third party data processing apparatus 106. The transferor 400 receives requests from the buyer 102 and the seller 104 and can return the appropriate responses. For example, the transferor receives the second part of the token from the buyer 102 and passes it, later, to the seller 104. The transferor 400 also routes the initial request and response (arrows 1 and 2) between the buyer 102 and the seller 104 when the portal 114 forms part of the third party 106. The verifier 402 establishes that the buyer 102 has accepted the subject of the transaction and authorises the transferor 400 to pass the second part of the token to the seller 104. The notifier 404 responds to a request from the buyer to cancel the transaction by alerting the buyer's bank 108 that the token is to be cancelled.

From the foregoing description of transaction initiation, completion and cancellation processes in an embodiment of the invention, it will be apparent to the skilled person that many modifications may be made to the described embodiment. It should be noted that the scope of the protection conferred by this document is not limited to the described embodiment, but by the appended claims.

The invention claimed is:

1. A transaction method in which a first party computer system transfers a first part of a payment token to a second party computer system to obtain the subject of a transaction, the first party computer system transfers a second part of the payment token to a third party computer system, the first party computer system issues a notification that the subject has been received, and the third party computer system, subsequent to receiving notification that a first party has received the subject, releases the second part of the payment token to the second party computer system to allow payment to a second party.

2. A transaction method according to claim 1, wherein the first party computer system transfers the first part of the payment token to the second party computer system via the third party computer system.

3. A transaction method according to claim 1, wherein the payment token does not identify the first party.

4. A transaction method according to claim 1, wherein the payment token does not contain information identifying or facilitating the identification of the first party's account.

5. A transaction method according to claim 1, wherein the payment token identifies the second party.

6. A transaction method according to claim 1, wherein the payment token identifies the second party's account.

7. A transaction method according to claim 1, wherein the first party's bank certifies at least a part of the payment token.

8. A transaction method according to claim 1, wherein the first party computer system obtains at least a part of the payment token from its bank.

9. A transaction method according to claim 1, wherein the first party computer system generates a part of the payment token from a part of the payment token obtained from its bank.

10. A transaction method according to claim 1, wherein the second party computer system authenticates the payment token.

11. A method according to claim 1, wherein the first party computer systems or its bank makes the payment token specific to the transaction.

12. A method according to claim 1, wherein the first party optionally decides to cancel the transaction by requesting the third party computer system to do so.

13. A transaction method according to claim 1, wherein a logistics agent transfers the subject of the transaction to the first party.

14. A transaction method wherein a first party computer system transfers a payment token to a second party computer system in exchange for the subject of a transaction, the method comprising the step, of the first party computer system transferring at least one part of a payment token to the second party computer system via a third party computer system, wherein the payment token does not identify a first party, wherein the payment token does not contain information identifying or facilitating the identification of the first party's account and the first party optionally decides to cancel the transaction by requesting a third party to do so.

15. A transaction method according to claim 14, wherein the first party computer system passes more than one part of the payment token to the second party computer system via the third party computer system.

16. A transaction method according to claim 14, wherein the payment token identifies a second party.

17. A transaction method according to claim 14, wherein the payment token identifies a second party's account.

18. A transaction method according to claim 14, wherein the first party's bank certifies at least a part of the payment token.

19. A transaction method according to claim 14, wherein the first party computer system obtains at least a part of the payment token from its bank.

20. A transaction method according to claim 14, wherein the first party computer system generates a part of the payment token from a part of the payment token obtained from its bank.

21. A transaction method according to claim 14, wherein the second party computer system authenticates the payment token.

22. A method according to claim 14, wherein the first party computer system or its bank makes the payment token specific to the transaction.

23. A transaction method according to claim 14, wherein a logistics agent transfers the subject of the transaction to the first party.

24. A transaction method in which a first party computer system transfers a first part of a payment token to a second party computer system to obtain the subject of a transaction, the first party computer system transfers a second part of the payment token to a third party computer system, the first party computer system issues a notification that the subject has been received, and the third party computer system, subsequent to receiving notification that the first party computer system has received the subject, releases the second part of the payment token to the second party computer system to allow payment to the second party computer system, wherein a logistics agent computer system transfers the subject of the transaction to the first party computer system.

25. A system for performing transactions, comprising a third party data processing apparatus connected to a first party computer system and a second party computer system engaging in a transaction for communication therewith, wherein the third party data processing apparatus comprises a transferor arranged to receive a second part of a payment token from a first party to a transaction and a verifier arranged to verify that the subject of the transaction has been received by the first party to enable the transferor to release said second part to the second party computer system for use with a first part of said token to permit payment to a second party.

26. A system according to claim 25, wherein the transferor is arranged to receive the first part of the token from the first party computer system and transfer the first part of the token to the second party computer system.

27. A system according to claim 25, wherein the payment token does not identify the first party.

28. A system according to claim 25, wherein the payment token does not contain information identifying or facilitating the identification of the first party's account.

29. A system according to claim 25, wherein the payment token identifies the second party.

30. A system according to claim 25, wherein the payment token identifies the second party's account.

31. A system according to claim 25, wherein at least a part of the payment token is certified by the first party's bank.

32. A system according to claim 25, wherein at least a part of the payment token is obtained from the first party's bank.

33. A system according to claim 25, wherein at least a part of the payment token is generated from a part of the payment token obtained from the first party's bank.

34. A system according to claim 25, wherein the third party includes a notifier arranged to cause cancellation of the transaction at the first party's behest.

35. A system according to claim 25, further comprising a logistics agent for transferring the subject of the transaction to the first party.

36. A system for performing transactions, comprising a first party computer system, a second party computer system and a third party computer system, said first party computer system and second party computer system being interconnected for communication via the third party computer system to enable the first party computer system to give a payment token to the second party computer system in return for the subject of a transaction, wherein the first party computer system is arranged to transfer at least one part of the payment token to the second party computer system via the third party computer system, and the payment token does not identify a first party.

37. A system according to claim 36, wherein the first party computer system is arranged to pass more than one part of the payment token to the second party computer system via the third party computer system.

38. A system according to claim 36, wherein the payment token does not contain information identifying or facilitating the identification of the first party's account.

39. A system according to claim 36, wherein the payment token identifies the second party.

40. A system according to claim 36, wherein the payment token identifies the second party's account.

41. A system according to claim 36, wherein at least a part of the payment token is certified by the first party's bank.

42. A system according to claim 36, wherein at least a part of the payment token is obtained from the first party's bank.

43. A system according to claim 36, wherein at least a part of the payment token is generated from a part of the payment token obtained from the first party's bank.

44. A system according to claim 36, wherein the third party computer system includes a notifier arranged to cause cancellation of the transaction at the first party's behest.

45. A system according to claim 36, further comprising a logistics agent for transferring the subject of the transaction to the first party.

46. A system for performing transactions, comprising a third party data processing apparatus connected to a first party computer system and a second party computer system engaging in a transaction for communication therewith, wherein the third party data processing apparatus comprises a transferor arranged to receive a second part of a payment token from the first party computer system to a transaction and a verifier arranged to verify that the subject of the transaction has been received by a first party to enable the transferor to release said second part to the second party computer system for use with a first part of said token to permit payment to the second party, wherein the payment token does not contain information identifying or facilitating the identification of the first party's account.

47. A system for performing transactions, comprising a first party computer system, a second party computer system and a third party computer system, said first party computer system and second party computer system being interconnected for communication via the third party computer system to enable the first party computer system to give a payment token to the second party computer system in return for the subject of a transaction, wherein the first party computer system is arranged to transfer at least one part of the payment token to the second party computer system via the third party computer system, the payment token does not identify a first party, and the payment token does not contain information identifying or facilitating the identification of the first party's account.

48. A system for performing transactions, comprising a third party data processing apparatus connected to a first party computer system and a second party computer system engaging in a transaction for communication therewith, wherein the third party data processing apparatus comprises a transferor arranged to receive a second part of a payment token from the first party computer system to a transaction and a verifier arranged to verity tat the subject of the transaction has been received by a first party to enable the transferor to release said second part to a second party computer system for use with a first part of said token to permit payment to a second party, wherein the system further comprises a logistics agent for transferring the subject of the transaction to the first party computer system.

49. A system for performing transactions, comprising a third party data processing apparatus connected to a first party computer system and a second party computer system engaging in a transaction for communication therewith, wherein the third party data processing apparatus comprises a transferor arranged to receive a second part of a payment token from the first party computer system to a transaction and a verifier arranged to verify that the subject of the transaction has been received by the first party to enable the transferor to release said second part to the second party computer system for use with a first part of said token to permit payment to the second party computer system, wherein the payment token does not identify the first party and the system further comprises a logistics agent for transferring the subject of the transaction to the first party.

* * * * *